Dec. 23, 1969             L. C. FRAZIER             3,485,692

TIRE BUILDING DRUM AND METHOD OF BUILDING PNEUMATIC TIRES

Filed Aug. 24, 1967             4 Sheets-Sheet 1

Inventor:-
Larry C. Frazier,

Dec. 23, 1969          L. C. FRAZIER          3,485,692
TIRE BUILDING DRUM AND METHOD OF BUILDING PNEUMATIC TIRES
Filed Aug. 24, 1967          4 Sheets-Sheet 2
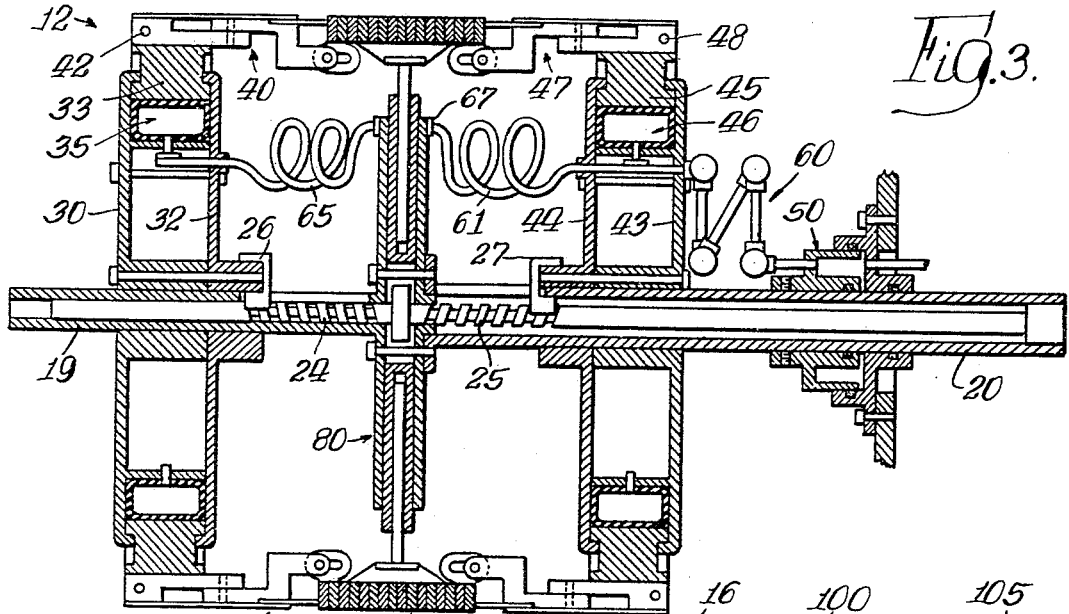
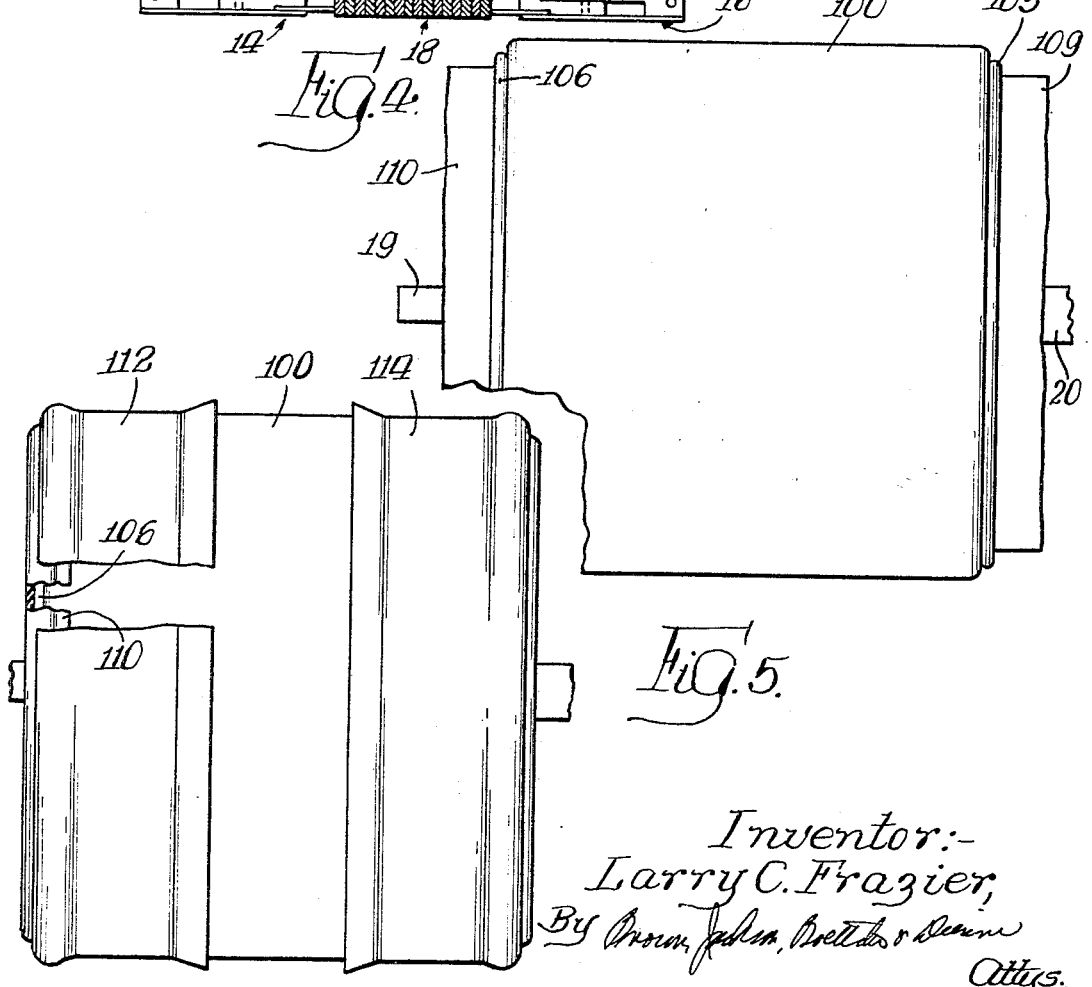
Inventor:-
Larry C. Frazier,
By Brown, Jackson, Boettcher & Dienner
Attys.

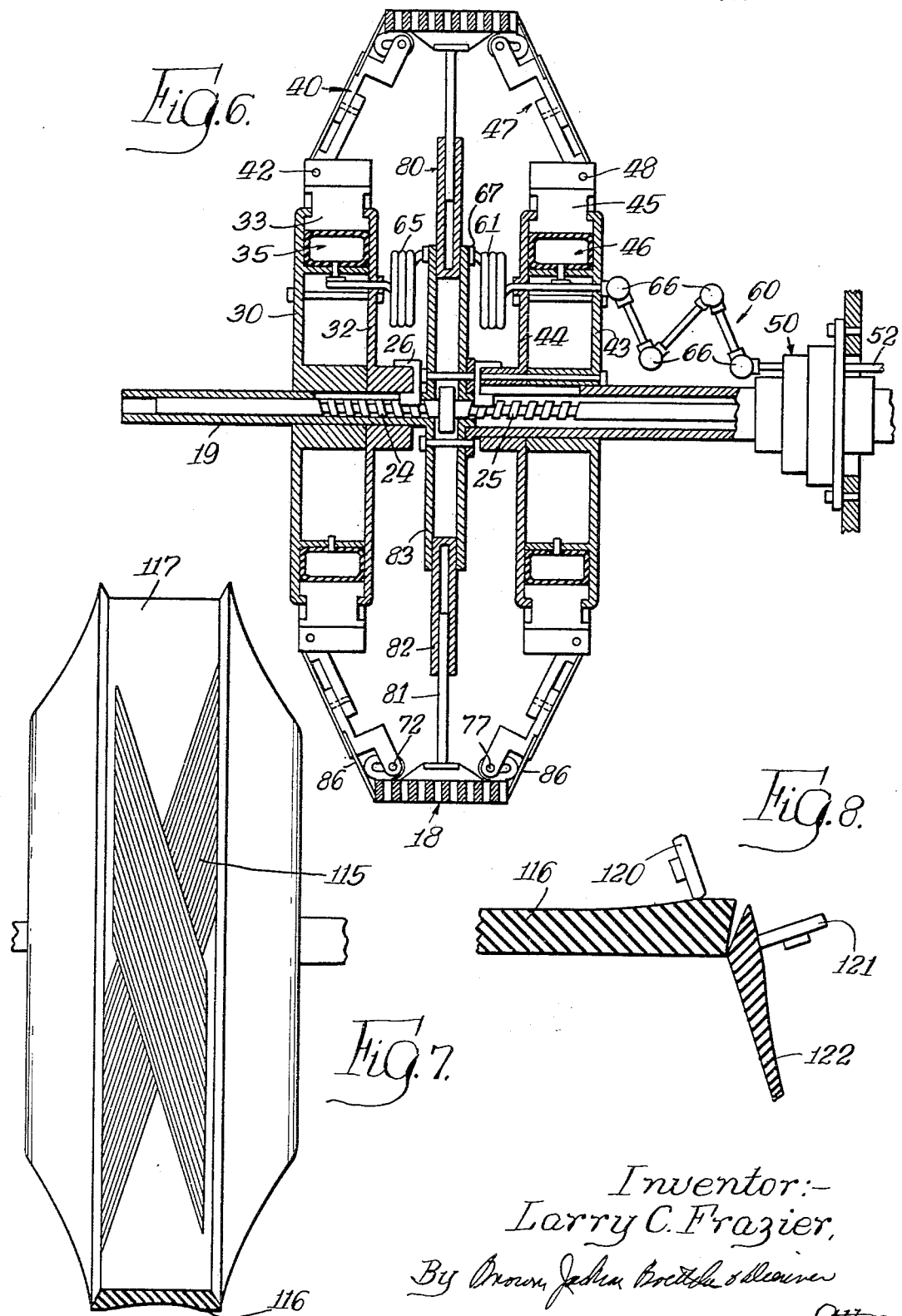

Dec. 23, 1969     L. C. FRAZIER     3,485,692
TIRE BUILDING DRUM AND METHOD OF BUILDING PNEUMATIC TIRES
Filed Aug. 24, 1967                              4 Sheets-Sheet 4
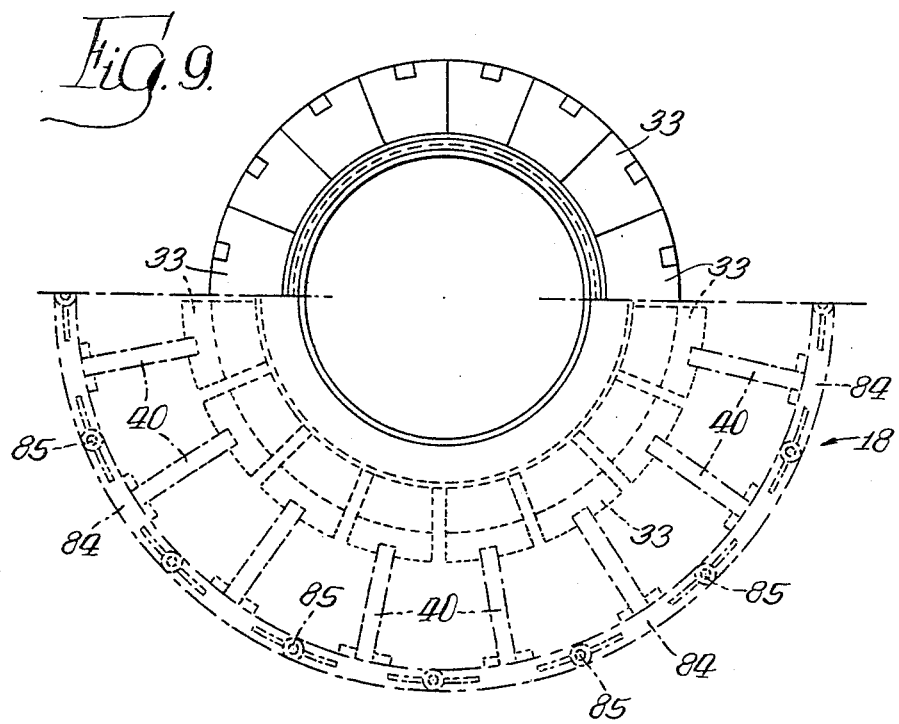
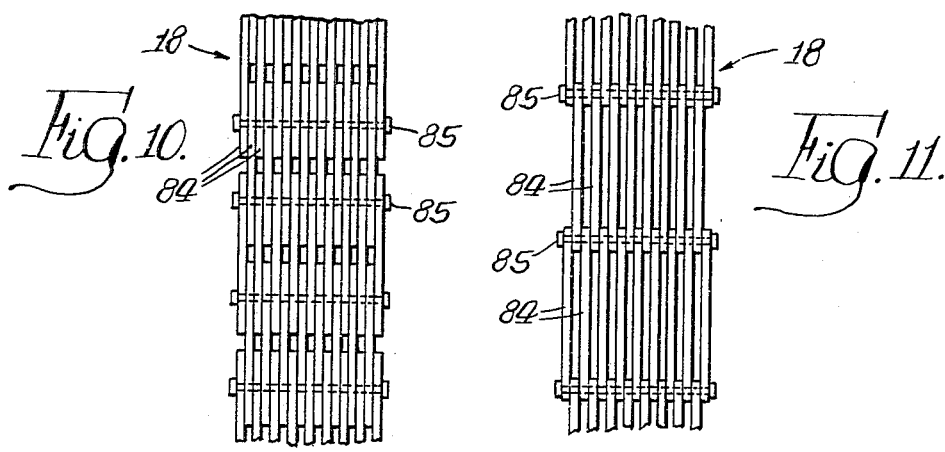
Inventor:-
Larry C. Frazier,

United States Patent Office 3,485,692
Patented Dec. 23, 1969

3,485,692
TIRE BUILDING DRUM AND METHOD OF BUILDING PNEUMATIC TIRES
Larry C. Frazier, Sun City, Ariz., assignor to National-Standard Company, Niles, Mich., a corporation of Delaware
Continuation-in-part of application Ser. No. 465,659, June 21, 1965. This application Aug. 24, 1967, Ser. No. 663,931
Int. Cl. B29h *17/16*
U.S. Cl. 156—123                                    16 Claims

ABSTRACT OF THE DISCLOSURE

Building pneumatic tires in which tire carcass material is firmly and rigidly supported in the form of a tubular cylinder for the application of certain components for a tire, such as tire beads, and in which the tire carcass material is then shaped to substantially the configuration of a completed tire with the crown portion thereof firmly and rigidly supported for application of a restrictive tread component and/or tread to the crown portion of the carcass.

---

This application is a continuation-in-part of my application Ser. No. 465,659, filed June 21, 1965 now abandoned.

The present invention relates to a tire building drum and methods of building pneumatic tires.

In the tire art today, it is common practice to build tires having carcasses formed of bias cut cord reinforced material according to the known flat band process in which the bias cut cord reinforced material is layed in the form of a tubular cylinder around a low crown drum presenting a first cylindrical and firm building surface. After laying of such bias cut cord reinforced material, bead rings are positioned inwardly of opposite ends of the tubular cylinder of the layed material, and the drum is then radially expanded a slight extent to provide a second cylindrical and firm surface having end shoulders against which the bead rings are seated, and after which the opposite ends of the bias cut material projecting axially of the shoulders of the drum are suitably positioned to encase the bead rings. The remaining components of the tire, such as the side walls and tread are then applied with the drum in position defining such second cylindrical surface after which the drum is collapsed and the assembled tire components removed for forming and curing in a conventional tire mold.

The foregoing flat band process has been widely adopted in the tire industry but the drum assemblies and processes practiced therewith are inadequate for the building of a tire embodying a restrictive tread component which in the completed tire lies between the crown of the carcass and the inner surface of the tread of the tire. Such restrictive tread components are variously referred to in the art, for example, as cincture structures or inextensible breakers and are characterized by having only nominal limited circumferential displacement in the molding of the tire and in the finished or completed tire have virtually no circumferential yield or displacement. Restrictive tread components of the character mentioned are important and necessary in radial or zero angle tires in which the carcass is reinforced by cord reinforcing means lying in planes extending radially outwardly or substantially so of the axis of rotation of the tire. The building of such radial tires with a restrictive tread component presents a problem which the art has not yet satisfactorily solved, and that problem is due to the fact that the restrictive tread component should preferably be applied on the tire carcass with the tire carcass at a diameter approximating its cured diameter in a completed tire.

The art has most frequently approached the foregoing problem by providing an inflatable bag component about which tire carcass material may be wrapped and then by admitting fluid under pressure into the inflatable bag radially expand the bag and the carcass material wrapped therearound into contact with a preformed restrictive tread component and tread usually supported on annular supporting means disposed radially outwardly around the bag and carcass. The foregoing arrangement has disadvantages the major one being that the inflated bag has a highly flexible easy displaceable outer periphery so that it is difficult to obtain firm adhesion between the expanded carcass and the restrictive tread component and tread. Further, machine or hand stitching of the restrictive tread component and tread to the carcass is not highly effective in that the inflated bag presents an inadequate surface to take the reaction of such stitching to secure the components together.

Thus, tire building drums having surfaces which are flexible or displaceable by externally applied forces are not satisfactory for effecting stitching of components to a tire carcass such as a restrictive tread component to the crown of a tire carcass. In the light of the foregoing, it is to be understood that in this specification and the appended claims, that surfaces referred to as "firm" or "rigid" means supporting surfaces that are not flexed or distorted by forces applied externally thereto.

Accordingly, it is an object of the present invention to provide a drum for building pneumatic tires embodying means providing a substantial cylindrical and firm surface for forming tire carcass material into a tubular cylinder with shoulders for seating the bead rings inwardly of the end portions of the tubular cylinder, and for then providing a substantially cylindrical and firm surface for supporting an intermediate portion of the tubular cylinder at a diameter approximating the cured diameter of the crown of the carcass for a finished tire, and at which a restrictive tread component and/or tread may be firmly stitched to said intermediate or crown portion of the carcass material.

A further object of the invention is to provide a drum as last noted having means defining a first stage at which a substantially cylindrical and firm first surface is provided for wrapping of tire carcass material therearound to form a tubular cylinder, a second stage at which the drum is radially expanded to define a second substantially cylindrical and firm surface providing shoulders for the attaching of bead rings inwardly of end portions of and to the tubular cylinder and at which bead rings may be encased by the end portions of the tubular cylinder and other components such as side walls applied to the tubular cylinder, and a third stage at which a substantially cylindrical and firm third surface is provided to dispose an intermediate portion of the tubular cylinder of carcass material at a diameter approximating the crown diameter of the carcass of a completed tire, and at which third stage a restrictive tread component and/or thread may be firmly adhered to the intermediate portion of the carcass material.

Tire carcass material for building radial tires is characterized by being substantially inextensible in the direction of the reinforcing cords embedded in the material and which reinforcing cords when the carcass material is formed into a tubular cylinder extend axially of the drum. This characteristic of the tire carcass material leads to a further problem in maintaining the peripheral transverse dimension of the drum between the bead shoulders substantially constant when the drum is displaced from its cylindrical configuration into the configuration for shaping the tire carcass material into substantially the configuration of a completed tire. Unless the transverse dimension of the drum between the bead shoulders is maintained substantially constant, the drum will not function well and the components of the tire will not be assembled in the desired relation.

Accordingly, it is a further object of the invention to provide a tire building drum in which the transverse peripheral dimension of the drum from bead shoulder to bead shoulder is substantially constant at and between the aforenoted second and third stages of the drum.

A further object of the invention is to provide methods of building pneumatic tires in which in addition to the conventional known steps of laying tire carcass material around a substantially cylindrical and firm supporting surface to form the carcass material into a tubular cylinder and the assembly of bead rings, side wall, and other components to such tubular cylinder, the steps of radially displacing an intermediate portion of the cylindrical supporting surface to define an intermediate substantially cylindrical and firm surface to dispose an intermediate portion of the carcass material at a diameter approximating the diameter of the crown portion of a carcass of a tire, and then applying a restrictive tread component and/or tread around the crown of the carcass while the latter is firmly supported on such intermediate cylindrical supporting surface.

The above and other objects and advantages of the invention will appear from the following detailed description of preferred embodiments of the invention.

Now in order to acquaint those skilled in the art with the manner of construction tire building drums and practicing the methods of the present invention, there is described below in connection with the accompanying drawings certain preferred embodiments of the invention.

Figure 1:
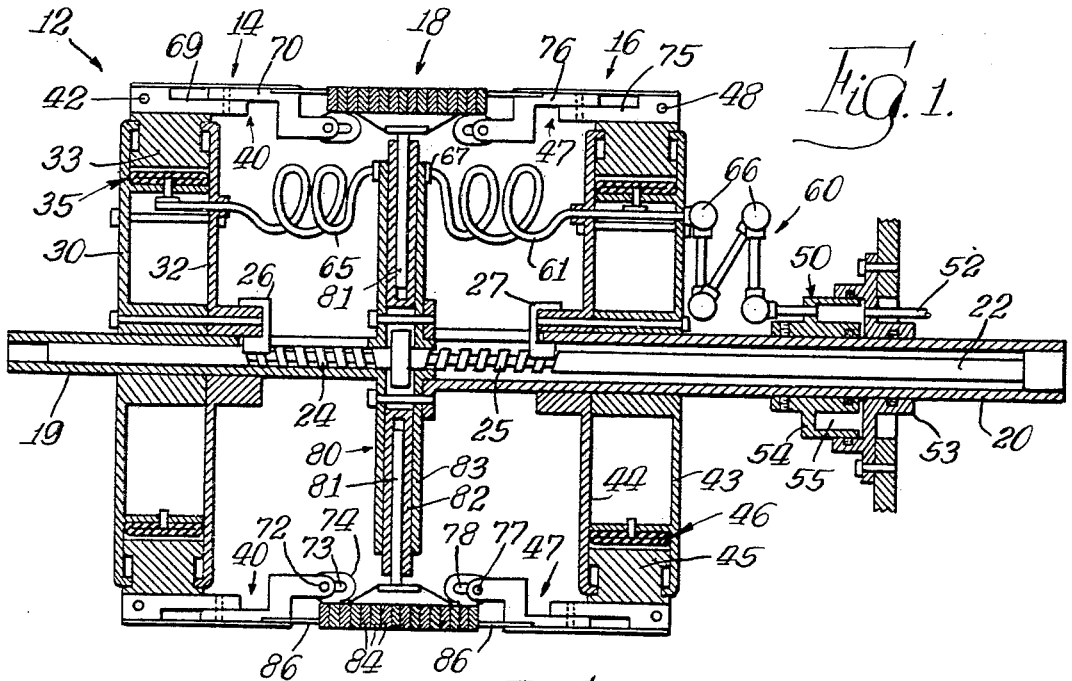
FIGURE 1 is a vertical sectional view of a tire building drum constructed in accordance with the principles of the present invention with components of the drum being positioned at a first stage defining a first cylindrical and firm surface of predetermined diameter for wrapping tire carcass material therearound.

FIGURE 3 is a vertical sectional view of the tire building drum of FIGURE 1 in which certain of the components have been disposed to positions at a second stage defining a second cylindrical and firm surface of predetermined diameter having end shoulders at which the bead rings are secured inwardly of the ends of the tire carcass material and in position for the applying of other components of a tire to the carcass material such as the side walls;

FIGURE 4 is a diagrammatic side elevational view of the drum as shown in FIGURE 3 and illustrating the bead rings secured to the tire carcass material at the ends of the second cylindrical surface;

FIGURE 5 is a diagrammatic side elevational view of the drum of FIGURE 3 in which opposite end portions of the tire carcass material have been layed over the bead rings at the shoulders of the second cylindrical surface to encase the bead rings, and with side wall components applied to the cylinder of carcass material around the encased bead rings and opposite end portions of the carcass material supported on the second cylindrical surface;

FIGURE 6 is a vertical sectional view of the tire building drum of FIGURE 3 in which certain of the components have been positioned at a third stage to define a third cylindrical and firm surface for the securing of a restrictive tread component and/or tread to the tire carcass;

FIGURE 7 is a diagrammatic side elevational view of components of a tire as formed at the foregoing first, second and third stages and showing diagrammatically the application of a restrictive tread component and tread to the carcass at the third stage position of the drum;

FIGURE 8 is an enlarged detail sectional view illustrating the juncture of the side edges of the tread with the outer peripheral edges of the side walls for the tire;

FIGURE 9 is a diagrammatic end elevational view illustrating the drum in its first, second and third stages in the constructing of a tire thereon with the drum in its first stage being illustrated in full lines, in its second stage by dotted lines, and its third stage by dot-dash lines;

FIGURE 10 is a diagrammatic plan view of a portion of supporting members forming a center section assembly of the drum in the first stage or contracted position of the drum; and FIGURE 11 is a plan view of the components of the center section assembly shown in FIGURE 10 displaced circumferentially relative to each other to define the foregoing third stage of the drum as illustrated in FIGURE 6.

Referring now to FIGURE 1 of the drawings the tire building drum 12 of the present invention comprises a pair of end head assemblies, indicated at 14 and 16, respectively, together with a center section assembly, indicated at 18, disposed between the end head assemblies 14 and 16. The end head assemblies 14 and 16 are mounted for rotation and axial movement relative to each other on shaft means 19 and 20, respectively. A screw shaft 22 projects through the shafts 19 and 20 and is provided with left and right hand screw portions 24 and 25, respectively, with a follower nut 26 for the end head assembly 14 having engagement with the screw threads 24 and a follower nut 27 carried by the end head assembly 16 having engagement with the screw threads 25 so that upon rotation of the screw shaft 22 in opposite directions, the end head assemblies 14 and 16 are moved axially relative to each other to inner and outer positions thereof.

The end head assembly 14 comprises a pair of axially spaced apart disc members 30 and 32 which at the outer peripheries thereof provide for the mounting of a plurality of segment members 33 for movement radially inwardly and outwardly between the spaced apart disc members 30 and 32. Segment moving means 35 in the form of an annular inflatable bag is supported inwardly of the inner ends of segment members 33 and which segment moving means upon admission of fluid under pressure thereto effects the radial outward movement of the segment members 33. First force transmitting means comprising a plurality of link means or end supporting means, as indicated at 40, are pivotally connected as by pins 42 to each of the segment members 33 and project axially inwardly of the drum.

The end head assembly 16 is of similar construction as end head assembly 14 and comprises axially spaced apart plate members 43 and 44 and between which and at the outer peripheries thereof a plurality of segment members 45, which like segment members 33, are disposed between the plate members for radial inward and outward movement with respect to the head assembly. Segment moving means 46 is supported between the plate members 43 and 44 and like segment moving means 35, provides for radial displacement of the segment members 45. Second force transmitting means comprising a plurality of link means or end supporting means 47 are pivotally connected as at 48 to the segment members 45 and project axially inwardly toward the lever means 40 of the end head assembly 14. The shaft means 20 provides for the support of a rotating air chamber, indicated generally at 50, which as shown is provided with a conduit 52 leading from a source of fluid under pressure, such as air, supported in a collar member 53 journalled on the shaft 20. The collar 53 together with a second collar member 54 defines an air chamber 55 from which conduit means 60 including a flexible conduit 61 extends to segment moving means 46 of the end head assembly 16 and from which a flexible conduit 65 having connection with conduit 61 by a manifold 67 extends to the segment moving means 33 of the end head assembly 14. The conduit means 60 is provided with conventional knuckle joints 66 to provide for connection of fluid under pressure to the segment moving means 33 and 46 of the end head assemblies 14 and 16 in the axial movement of the end head assemblies relative to each other and in the rotation thereof around the shaft means 19 and 20.

The link means or end supporting means 40 comprises axially adjustable links 69 and 70 with the outer end of link 69 being connected at pivot pin 42. The inner end of link 70 carries a pin 72 having lost motion connection in a slot 73 of a supporting frame 74 of the center section assembly 18. In the same manner, the link means or end supporting means 47 of the end head assembly 16 includes a first link 75 pivoted at its outer end on pin 48 and an axially adjustable inner link 76 which through a pin 77 has lost motion connection in a slot 78 of the mounting frame 74 of the center section assembly 18. The link 69 and 70 of link means 40 and the links 75 and 76 of link means 47 are adjustable to selected fixed positions axially relative to each other to provide a drum of desired axial length for building tire carcasses of desired dimensions. A telescopic guide assembly, indicated generally at 80, provides for guiding of the center section assembly 18. The supporting frame 74 of the center section assembly 18 is provided with radially inwardly extending guide rods 81 having guiding engagement with inner telescopic tubular members 82 in turn telescopically associated with outer tubular members 83 supported around screw shaft 22 for the support for the center section assembly 18.

The aforedescribed left and right hand screw portions 24 and 25 of screw shaft 22 together with the follower nuts 26 and 27 of the end head assemblies 14 and 16 define a moving means for effecting uniform radial inward and outward movement of the telescopic members associated with the center section assembly.

As best seen in FIGURES 10 and 11, the center section assembly 18 comprises a plurality of circumferentially relative movable elongated and flat blade like supporting members 84 through which pins 85 extend so that the supporting members may move relative to each other from their retracted position as shown in FIGURE 10 to their circumferentially extended positions as shown in FIGURE 11 to thus provide for varying the effective diameter of the center section assembly 18. The supporting members 84 have generally convex outer edge surfaces to provide substantially cylindrical supporting surfaces in the retracted and expanded positions thereof. The foregoing lever or end supporting means 40 and 47 as shown may have thin shields or panels 86 to present smooth outer cylindrical surfaces for the laying of tire building material therearound as below described. It will be seen that the link or end supporting means 40 and 47 of the end head assemblies 14 and 16 and the supporting members 84 of the center section assembly 18 thus constitute means for providing substantially cylindrical firm supporting surfaces at the peripheries thereof.

Figure 2:
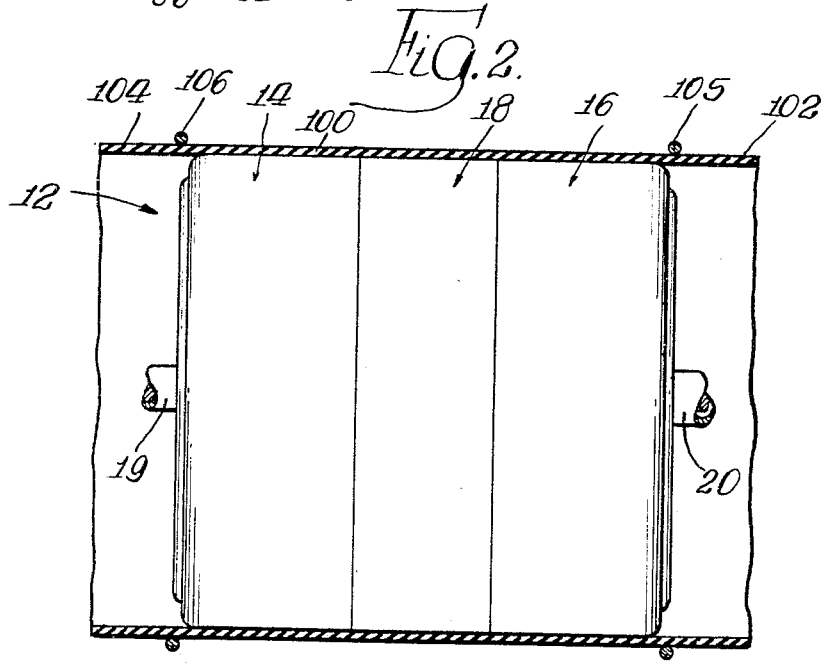
FIGURE 2 is a diagrammatic side elevational view of the drum of FIGURE 1 showing tire carcass material layed therearound to form a tubular cylinder and bead rings for the tire carcass.

In the first stage position of the drum as shown in FIGURE 1, suitable tire carcass material is wrapped or layed around a first cylindrical and firm surface of the drum defined by the link or end supporting means 40 and 47 and support members 84, as shown in FIGURE 2, in the form of a tubular cylinder 100 with opposite end portions as at 102 and 104 projecting axially outwardly of the ends of the end head assemblies of the drum. Also, as shown in FIGURE 2, bead assemblies 105 and 106 are disposed inwardly over the outer ends of the tubular cylinder 102 adjacent the opposite ends of the drum. After completion of the laying or wrapping of the tire carcass material around the drum at its first stage, in the position thereof as illustrated in FIGURE 1, and upon placement of the bead rings 105 and 106 as noted, the end head assemblies and center section assembly of the drum assembly are displaced radially outwardly by the admission of fluid under pressure to the segment moving means 35 and 46 to move the segment members 33 and 34 radially outwardly and which through the link or end supporting means 40 and 47 dispose the supporting members 84 of the center section assembly 18 in positions defining a second stage providing a second substantially cylindrical and firm surface of greater diameter than the cylindrical surface formed in the first stage position of the drum as shown in FIGURE 1.

In FIGURE 4 the drum is at its aforedescribed second stage and it will be noted in the latter figure that the tire carcass material 100 has been expanded slightly radially outwardly and that the bead rings 105 and 106 are seated at shoulders formed at the outer ends of the end head assemblies 14 and 16. The outwardly projecting end portions 109 and 110 of the tire carcass material may then be layed over the bead rings 105 and 106 in any suitable manner to encase the bead rings 105 and 106 in the carcass material. Thereafter and as shown in FIGURE 5, side wall components 112 and 114 are applied to opposite end portions of the carcass at the second stage of the tire building drum. As aforenoted such second cylindrical supporting surfaces is firm and rigid to provide for the effective application of the side walls 112 and 114 and such other components of the tire as may be desired. After assembly of the aforementioned components, the end head assemblies 14 and 16 through actuation of the screw means 22 are moved axially toward each other to inner positions as seen in FIGURE 6 and which movement of the end head assemblies 14 and 16 toward each other through the link or end supporting means 40 and 47 displaces the center section assembly 18 radially outwardly and which radial outward movement of the center section assembly effects the relative circumferential movement of the supporting members 84 to define a third substantially cylindrical and firm surface lying radially outwardly of and between the end head assemblies 14 and 16. In order to initiate radial outward movement of the center section assembly 18 the drum may be rotated in any suitable manner to provide for taking up the lost motion between pins 72 and 77 with respect to their associated slots 73 and 78 by centrifugal force. The aforedescribed connection of the center section assembly 18 with the link or end supporting means 40 and 47 provides for the rigid support of the radially displaced center section assembly and the several circumferentially movable supporting elements 84 to define a substantially cylindrical and firm third surface for the application of a restrictive tread component and/or tread to the radially expanded intermediate portion of the wrapped carcass material. Preferably the end head assemblies 14 and 16 upon relative axial movement with respect to each other to their inner positions as seen in FIGURE 6 the center section assembly 18 is disposed with the supporting members 85 thereof defining such third cylindrical and firm surface to disposed the carcass material supported thereon at approximately the desired diameter of the crown portion of the carcass of a completed tire.

As before noted, tire carcass material for a radial tire when layed in the form of a cylinder around a drum is substantially inextensible in a direction axially of the drum. By reason of this characteristic of the tire carcass material, the above described lost motion connections provided by pins 72 and slots 73, and pins 77 and slots 78, respectively, provide means for maintaining the transverse peripheral dimension of the drum between the bead shoulders of the drum at which the beads 105 and 106 are positioned substantially constant so as not to interefer with the radial expansion of the drum and properly orient the components of the tire on the drum. In the absence of means such as afforded by the last mentioned lost motion means, the peripheral transverse dimension of the drum between the drum shoulders would elongate in movement of the components of the drum from the above described second stage to the third stage thereof.

Upon reference now to FIGURES 7 and 8, it will be understood that the drum assembly is at its above described third stage and as shown a restrictive tread component, indicated diagrammatically at 115, and together with a tread 116 is applied to the intermediate radially displaced crown portion 117 of the tire carcass material. The restrictive tread component 115 is of an inner diameter substantially equal to the outer diameter of the expanded crown portion 117 of the carcass material. In the construction described the support members 84 define a firm substantially cylindrical working surface so that the restrictive tread component and tread may be adhered to the crown of the carcass by stitching as indicated at 120 and 121 in FIGURE 8. As shown in FIGURE 8, the side edge of the tread is disposed closely adjacent the outer circumferential side edge of a side wall 122 of the tire so that a firm and tightly adhering connection is made between the outer circumferential edges of the side walls and the adjacent edges of the tread for the tire. Upon completion of the application of the restrictive tread component and tread to the tire carcass, the drum is returned to its first stage diameter position at which the completed tire is removed. Thereafter, the tire may be cured in a conventional tire mold to complete fabrication of the tire.

As previously mentioned in fabricating radial or zero angle tires the restrictive tread component must be applied to accurate circumferential length on the crown of a carcass and for such purpose the foregoing third cylindrical and firm surface at the third stage of the drum of the present invention affords a convenient and efficient structure or that purpose. Normally the restrictive component when applied to the crown of the carcass may be slightly less than the cured diameter of the tire to enable the assembly and curing of the tire components in a tire mold.

While there has been shown and described preferred embodiments of the drum assembly and method of the present invention, it will be understood that various modifications and rearrangements may be made therein without departing from the spirit and scope of the invention.

The invention claimed is:

1. A drum for building pneumatic tires comprising a pair of end head assemblies mounted for axial movement with respect to each other between outer and inner end positions, and an intermediate center section assembly mounted between and connected with said end head assemblies, a cylindrical firm surface defining means for each of said end head assemblies and said intermediate center section assembly together defining a substantially cylindrical and firm surface in said outer end positions of said end head assemblies, and said cylindrical firm surface defining means of said center section assembly at the said inner positions of said end head assemblies defining a substantially cylindrical and firm surface of less axial extent than and lying radially outwardly of said first stated cylindrical and firm surface.

2. The drum of claim 1 characterized by said cylindrical firm surface defining means of said intermediate center section assembly comprising a plurality of intermediate peripherally extending supporting members movable radially outwardly and inwardly and circumferentially relative to each other upon movement of said end head assemblies axially inwardly and outwardly, respectively.

3. The drum of claim 2 in which said cylindrical firm surface defining means of said end head assemblies comprise end supporting means defining predetermined spaced apart bead shoulders in the outer end positions of said end head assemblies.

4. The drum of claim 3 characterized by the provision of means between said end supporting means and said intermediate section assembly for maintaining the transverse peripheral dimension between said bead shoulders substantially constant at and between the inner and outer end positions of said end head assemblies.

5. The drum of claim 4 characterized by the provision of telescopic means for said intermediate center section assembly for guiding the latter in its radial inward and outward movements.

6. The drum of claim 2 characterized by the outer surfaces of said intermediate supporting members being convex in the circumferential direction thereof.

7. The drum of claim 1 characterized by said cylindrical firm surface defining means of said intermediate center section assembly comprising a plurality of first and second circumferentially arranged sections each comprising a plurality of peripherally extending intermediate supporting members disposed in spaced apart side-by-side relation with the intermediate supporting members of the first of said sections being disposed between the intermediate supporting members of said second sections for movement radially and circumferentially relative to each other, and force transmitting means between said end head assemblies and said intermediate center section assembly to force said intermediate supporting members to positions at which the outer convex surfaces thereof lie in said cylindrical surfaces upon predetermined axial movement of said end head assemblies with respect to each other.

8. A drum for building pneumatic tires comprising a pair of end head assemblies mounted on a common axis for relative axial movement with respect to each other between outer and inner end positions, an intermediate center section assembly, and mounting means for mounting said intermediate center section assembly between said end head assemblies for movement radially with and outwardly of the latter, said intermediate center section assembly comprising means including a plurality of intermediate peripherally extending supporting members movable circumferentially relative to each other in the radial movement of said center section assembly, force transmitting means between said end head components and said intermediate center section comprising end supporting means which, together with said intermediate supporting members of said intermediate center section assembly in said outer end positions of said end head assembly define a first substantially cylindrical and firm surface, said force transmitting means in said outer end positions of said end head assemblies radially displacing said end supporting means of said end head assemblies and said intermediate supporting members of said center section assembly to define a second substantially cylindrical and firm surface of greater diameter than said first cylindrical surface, and said force transmitting means in said inner positions of said end head assemblies disposing said intermediate supporting members of said center section to positions defining a third substantially cylindrical and firm surface of less axial extent than lying radially outwardly of said second substantially cylindrical surface.

9. In a method of building a pneumatic tire in which tire carcass material is layed around a substantially cylindrical and firm surface to form the carcass material into a tubular cylinder, and in which axially spaced apart bead rings are encased by end portions of the tubular cylinder, the steps comprising, displacing an intermediate portion of said supporting surface to define an intermediate substantially cylindrical and firm surface to dispose an intermediate portion of said carcass material of said tubular cylinder at a diameter approximating the diameter of the crown portion of the carcass of the tire, and then applying a restrictive tread component of a diameter approximating the diameter of said intermediate portion of said carcass material around the crown portion of the latter and while supported on said intermediate cylindrical surface.

10. The method of claim 9 characteried by maintaining the transverse peripheral dimension between said bead rings substantially constant while displacing said intermediate portion of said supporting surface to the diameter approximating the diameter of said crown portion.

11. The method of building a pneumatic tire comprising the steps of laying tire carcass material around a first substantially cylindrical and firm surface of predetermined diameter to form the carcass material into a tubular cylinder having end portions extending axially beyond the ends of said first surface, placing bead rings inwardly of the opposite end portions of said tubular cylinder at said ends of said first surface, uniformly increasing the diameter of said first surface to provide a second cylindrical and firm surface to secure said bead rings to said tubular cylinder at said ends of said first surface, disposing said opposite ends of said tubular cylinder to encase said bead rings, applying tire side wall components at the ends of said tubular cylinder of said carcass material on said second surface, displacing an intermediate portion of said second surface to define a third cylindrical and firm surface of greater diameter than said second surface to dispose an intermediate portion of said tubular cylinder of carcass material at a diameter approximating the diameter of the crown portion of the carcass of a tire, and then applying a restrictive tread component and tread to said intermediate portion of said carcass material while supported on said third cylindrical surface.

12. An annular assembly for a tire building drum comprising a plurality of first and second circumferentially arranged sections each comprising a plurality of peripherally extending supporting members disposed in spaced apart side-by-side relation with the supporting members of the first of said sections being disposed between the supporting members of said second sections for movement radially and circumferentially relative to each other to provide supporting surfaces of variable peripheral extent, a pair of end head components disposed at opposite ends of said first and second sections movable axially toward and away from each other between outer and inner end positions, respectively, and force transmitting means between said end head components and said first and second sections for disposing said supporting members in positions at which the outer surfaces thereof define a plurality of rigid supporting surfaces of varying peripheral extent at predetermined axial positions of said end head components with respect to each other.

13. An annular assembly for a tire building drum comprising shaft means, a center section assembly defined by a plurality of first and second sections each comprising a plurality of peripherally extending supporting members disposed in spaced apart side-by-side relation with the supporting members of the first of said sections being disposed between the supporting members of said second section for movement radially and circumferentially relative to each other, the outer surfaces of said supporting members defining a first rigid supporting surface in an inward radial position of said supporting members and a second rigid supporting surface of greater peripheral extent than said first rigid supporting surface in a radial outer position of said supporting members, and telescopic assembly means between said center section assembly and said shaft means comprising radially extending inner and outer telescopic members movable radially relative to each other upon movement of said supporting members between their radial inner and outer positions.

14. The annular assembly of claim 13 characterized by said outer surfaces of said supporting members being convex circumferentially thereof so that said first rigid supporting surface is substantially cylindrical and said second rigid supporting surface is substantially cylindrical and of a larger diameter than said first rigid supporting surface, and said supporting members in the radial outer positions thereof having their adjacent end portions in interlaced relation with respect to each other.

15. The annular assembly of claim 14 characterized by pin means extending transversely of the supporting members of said first and second sections to limit the relative circumferential movement of said supporting members with respect to each other in a radial outward position of said supporting members.

16. The annular assembly of claim 13 including moving means for effecting uniform radial inward and outward movement of said telescopic members.

References Cited

UNITED STATES PATENTS

| 1,254,685 | 1/1918 | Grosvenor | 156—414 |
| 1,577,664 | 3/1926 | Tew | 156—414 X |
| 2,325,001 | 7/1943 | McLaughlin | 156—415 |
| 2,339,543 | 1/1944 | Bishop | 156—145 |
| 3,093,531 | 6/1963 | Frohlich et al. | 156—132 X |
| 3,127,294 | 3/1964 | Porter | 156—416 X |
| 3,138,510 | 6/1964 | Hindin et al. | 156—416 X |
| 3,184,361 | 5/1965 | Allitt | 156—123 X |
| 3,188,260 | 6/1965 | Nebout | 156—415 |

HAROLD ANSHER, Primary Examiner

C. B. COSBY, Assistant Examiner

U.S. Cl. X.R.

156—128, 131, 415, 416